United States Patent [19]

Bernal G. et al.

[11] 4,090,776
[45] May 23, 1978

[54] FABRICATION OF OPTICAL WAVEGUIDES

[75] Inventors: Enrique Bernal G.; Di Chen, both of Minnetonka; Barry G. Koepke, Mound; James David Zook, Burnsville, all of Minn.

[73] Assignee: Honeywell Inc., Minneapolis, Minn.

[21] Appl. No.: 731,862

[22] Filed: Oct. 13, 1976

[51] Int. Cl.² .............................................. G02B 5/14
[52] U.S. Cl. .................................................. 350/96.12
[58] Field of Search .......... 350/96 WG, 96 GN, 96 R

[56] References Cited

U.S. PATENT DOCUMENTS

| 3,542,536 | 11/1970 | Flam et al. | 350/96 R |
| 3,809,686 | 5/1974 | Chandross et al. | 350/96 WG |

OTHER PUBLICATIONS

"Fabrication of Channel Optical Waveguides in Glass by CW Laser Heating" by Paulopoulos et al., J. of Appl. Phys., vol. 45, No. 11, Nov. 1974.

*Primary Examiner*—John K. Corbin
*Assistant Examiner*—Stewart Levy
*Attorney, Agent, or Firm*—Omund R. Dahle

[57] ABSTRACT

Optical waveguides are fabricated by heating a region of a body of flat filter glass with an energy beam such as a scanning focused laser beam. The region is locally heated to a temperature at which softening occurs. Upon cooling two differing effects occur, the two effects causing a "W" shaped index of refraction profile. The first effect is the photoelastic effect due to the residual stress introduced as the heated material cools and contracts. The residual tensile stress is constant in the softened region, but decreases as the distance from the center of the heating increases. Since the density and therefore the refractive index of this region is inversely proportional to the residual stress, this effect resulted in a local refractive index minimum. The other effect is the material density change in the softened region. As the cooling rate is small in the center and large in the edge of this softened region, a density change occurs with the center attaining the highest value and decrease towards the edge. The refractive index change due to this effect is proportional to the density and therefore resulted in a peak. The combined result of these two effects produces a "W" shape refractive index profile.

7 Claims, 7 Drawing Figures

FABRICATION OF OPTICAL WAVEGUIDES

This application is related to copending applications Ser. No. 540,920, by Enrique Bernal G., filed Jan. 13, 1975, entitled "Fabrication of Optical Waveguides" and assigned to the same assignee as this application. Reference is also made to a co-pending application by Di Chen and Barry G. Koepke entitled "Optical Waveguide," Ser. No. 540,919, filed on Jan. 13, 1975 and assigned to the same assignee as this application.

BACKGROUND OF THE INVENTION

Techniques of guiding optical waves in planar optical materials, with an ultimate objective of achieving integrated optics similar to integrated electronics, have been advancing rapidly in the last few years. Components for use with guided optical waves, such as modulators, deflectors, lasers, detectors and other passive and active devices are being demonstrated and developed in research laboratories throughout the world. The activity can be divided into the following areas: (1) the development of techniques of guiding the optical waves, (2) the development of suitable materials media and (3) the development of modern microfabrication technology. It is of paramount importance to the objective of optical integration that all of these can be simultaneously satisfied in a material which possesses desirable physical effects.

Waveguiding in many useful optical media has been achieved. Thin film waveguides have been prepared on suitable substrates by, for example, sputtering, R. H. Deitch, E. J. West, T. G. Giallorenzi and J. F. Weller, "Sputtered Thin Films for Integrated Optics," Appl. Opt., 13, 712 (1974) and epitaxial growth, W. T. Lindley, R. J. Phelan, C. M. Wolfe and A. G. Foyt, Appl. Phys. Lett., 14, 197 (1969). Waveguiding has also been achieved by modification of the refractive index of the medium surface by diffusion, I. P. Kaminow and J. R. Carruthers, Appl, Phys. Lett., 22, 326 (1973); proton irradiation, E. R. Schineller, R. P. Flan and D. W. Wilmot, "Optical Waveguides Formed by Proton Irradiation of Fused Silica," J. Opt. Soc. Am., 58, 1171 (1968) and U.S. Pat. No. 3,543,536; and ion implantation, E. Garmire, H. Stoll, A. Yariv and R. G. Hunsperger, Appl. Phys. Lett., 21, 87 (1972). Waveguiding in glass below the bottom of grooves created by a laser beam is reported, T. G. Pavlopolous and K. Crabtree, "Fabrication of Channel Optical Waveguides in Glass by CW Laser Heating," Journal of Applied Physics, Vol. 45, No. 11, page 4964, November 1974.

SUMMARY OF THE INVENTION

In the present invention, surface optical waveguides are produced by heating with a laser beam a surface region of a body of flat filter glass. The refractive index of glass is dependent on thermal treatment through changes in the fictive temperature, and through the photoelastic effect caused by the introduction of residual strains. The concept of fictive temperature has been described by E. U. Condon, "Physics of the Glassy State; II, Transformation Range," Am. Journ. Phys, 22, 132 (1954). We have found that both of these effects can occur on the surface of a flat Corning Cs-2-30 filter glass (zinc-soda type cadmium-sulfoselenide filter glass) when scanned by a focused Argon laser beam, producing multimode channel waveguides useful for propagation of 6328A HeNe laser light. The refractive index of the laser heated region as observed by a Jamin-Lebedeff interference microscope reveals a W-shape profile, with a radius of the central waveguiding region of 20-150 $\mu m$ depending on the laser power and scanning speed.

DETAILED DESCRIPTION OF THE PREFERRED EMBODIMENTS

In an optical waveguide of the type used for integrated optics, the waveguide region must have an index of refraction which is greater than the surrounding regions. In the previously mentioned co-pending patent application by Di Chen and Barry G. Keopke, it is taught that the greater index of refraction within the waveguide region can be produced by residual stress. The above identified co-pending patent application, Ser. No. 540,920, teaches a highly advantageous method of forming a surface waveguide having a stress-induced increase in refractive index over that of the surrounding substrate. The present application teaches a surface waveguide produced by heating with a laser beam a surface region of a body of glass. The refractive index of the outer portion of the heated region drops below that of the body. The core or axial portion of the heated region has a refractive index higher than the outer portion, but less than that of the body. The waveguiding is in the core portion.

Figure 1:
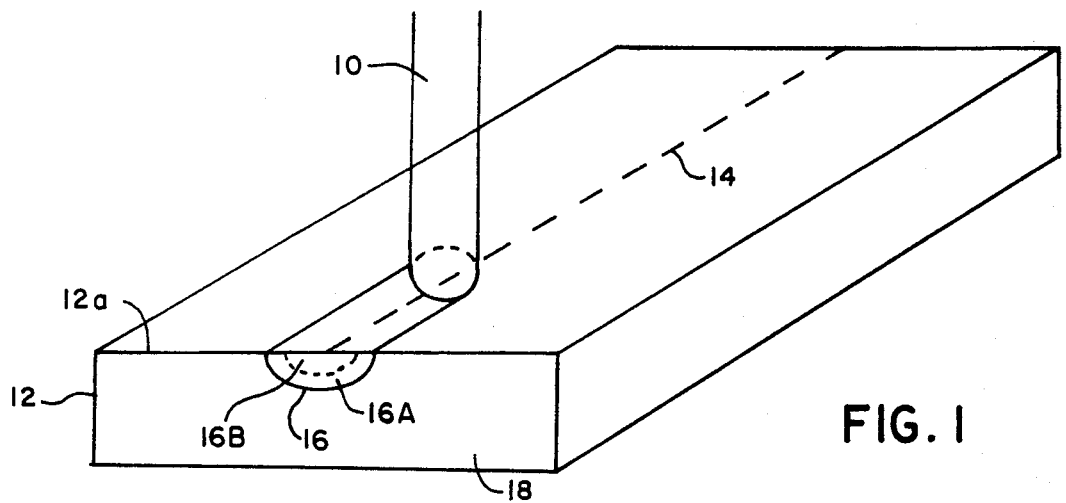
FIG. 1 shows the formation of an optical waveguide by heating with a laser beam.

FIG. 1 shows diagrammatically the method of the present invention. A laser beam 10 is directed upon a surface 12a of optical body 12. In one specific embodiment we used a flat green absorbing Corning CS-2-60 filter glass and a green focused beam from an Argon laser. Laser beam 10 is directed across surface 12a along the path described by dotted line 14. Laser beam 10 has an intensity which is sufficient to cause heating of region 16 within body 12 to a temperature at which softening occurs.

In one specific embodiment to produce the channel waveguide, the glass sample was placed near the focal point of an Argon laser beam using an f/2 optical lens, the sample being mounted in a motor driven x-y micropositioning stage. By controlling the drive speed and laser power level, channel waveguides of various dimensions were obtained.

Figure 5:
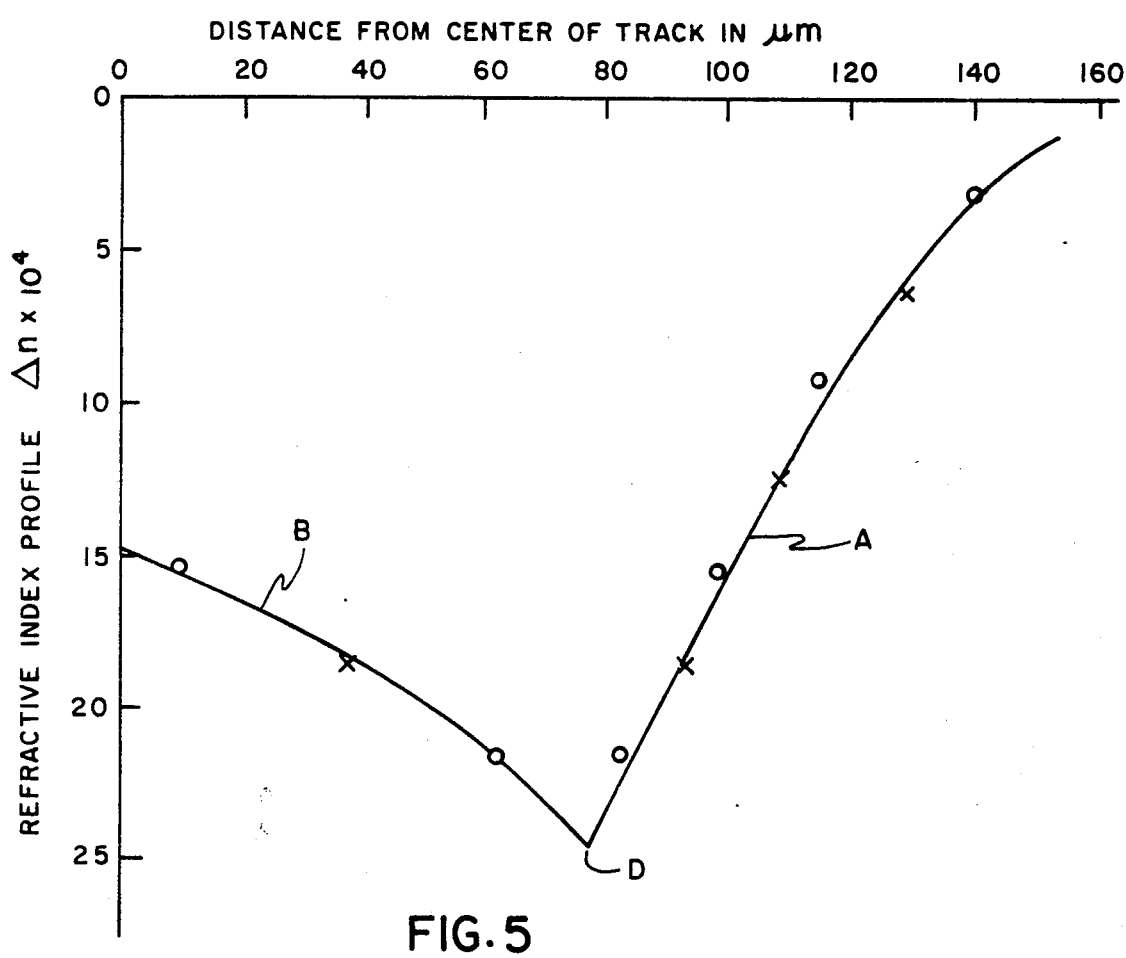
FIG. 5 is a graphical representation of incremental refractive index $\Delta n$ as a function of the radial distance from the center of the laser heated region. The curve shows one-half of the W of the W-shaped profile.

The material in region 16 tries to expand as its temperature rises, but is constrained on three sides by the adjacent substrate material 18 that is not heated. This causes the heated material in region 16 to be under compression. At a certain temperature, the material in the heated region softens and plastic deformation takes place in region 16B. As the material in region 16 cools two different effects occur. The outer area or peripheral area 16A of region 16 cools first because of the heat sink effect of the adjacent material 18. When the heated zone cools to room temperature it contracts, putting the unheated material in a state or residual tensile stress and thereby decreasing the refractive index as shown in FIG. 5 as curve portion A. As the softened central area or core area 16B of region 16 cools from softening temperature, the cooling rate is much faster than that originally used for the glass. The peripheral of 16B cools faster than the center and finds itself in a state of lower density and lower refractive index relative to that of the center region. Thus a density decrease outwardly towards the peripheral of 16B is obtained. The index of refraction profile for this axial area, curve portion B, is the reverse of that of the outer area, and as shown in FIG. 5, the refractive index for the axial area B is higher than that of the surrounding outer area A although not as high as in substrate area 18. Waveguiding within this axial area B of region 16 can be obtained. Thermal expansion during heating and the rapid cooling that follows results in a minute ridge on the glass surface. The profile of the ridge traced by a profilometer shows a peak height h of 0.5-3µm, and a full width w at the 1/e point of 40-130 µm. We find that the product h.w is relatively insensitive to the scanning speed, and is approximately related to the laser power P in watts by $$h.w - 320 (P - 0.66) \mu m^2 \quad (1)$$

for $p < 1$ watt. It is to be noted that the laser power referred here is the laser output power. The actual absorbed power is above one half of that to take into account of the losses of the various optical components.

Based on the surface deformation, we can estimate the upper limit of the elastic strains induced in the neighborhood outside the laser heated region, assuming there is no stress relief during cooling and the change of volume occurs elastically. For $h = 1$ µm, we obtain a strain of 0.005. The strain induced refractive index change $\Delta n_s$ at this point can in turn be estimated to be $$\Delta n_n \simeq -\tfrac{1}{2} n_r^3 p \simeq -0.0025 \quad (2)$$

where $n = 1.507$ is the measured refractive index of the glass, p is the photoelastic coefficient assumed to be 0.3 based on D. A. Pinnow "Guidelines for Selection of Acousto-optic Materials." IEEE J. Quantum Electronics QE-6, 223 (1970). Outside this region, the strain is tensile and falls off of 1/r, and so is $\Delta n_s$.

The refractive index profile can be understood by invoking the concept of fictive temperature, $\tau$. In the central portion of the laser heated region, the temperature rise exceeds $\tau_o$, the existing fictive temperature of the glass. The rate of cooling and consequently the fictive temperature is expected to be dependent on the radial coordinate. Since the center of the heated region cools at a lower rate than the outer region, it will acquire the lowest $\tau$ value, highest density and therefore the highest refractive index. Based on this deduction, the crossectional profile on the index of refraction of the laser heating induced waveguide should take a W shape. The central hump corresponds to the region of higher density and is due to $\tau$ change, and the wings are due to the strain induced effect. FIG. 5 thus shows one half of the W shaped profile mentioned above.

Figure 4:
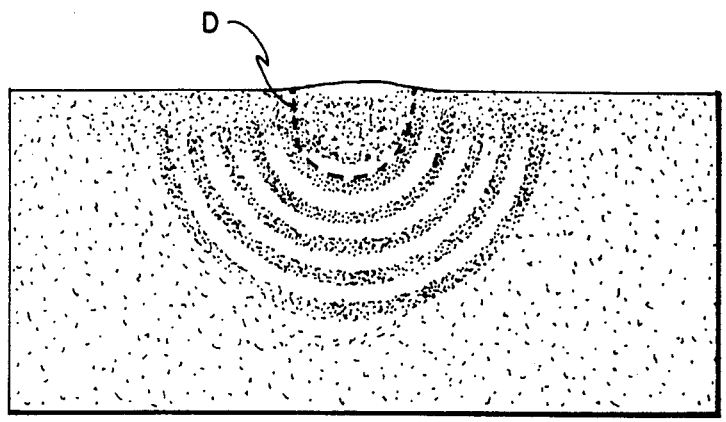
FIG. 4 is a drawing of an interference microscope view of the waveguide crossection.

FIG. 4 is a crossectional representation of the view from an interference microscope of the laser heated area. The dashed curved line D indicates the approximate area of discontinuity D in the waveguide corresponding to discontinuity point D of FIG. 5.

Experimental measurements of the refractive index profile were obtained using a Jamin-Lebedeff interference microscope. A glass slab containing a crossection of the laser heating induced waveguide was cut and polished optically flat and parallel on both sides. A typical interference pattern of the waveguide crossection is shown in FIG. 4. The semicylindrical symmetry of the profile is evident here. Careful examination of this interference pattern as the analyzer angle on the microscope is varied reveals that there is a refractive index minimum at a distance of 80 µm from center. The final analyzed profile for $\Delta n$ is FIG. 5. The magnitude of the refractive index change in the strained region is about $3 \times 10^{-3}$, in agreement with Eq. (2). The central region has a localized refractive index increase of $\Delta n \sim 10^{-3}$. Based on these results, we can estimate the numerical aperture N.A. of the waveguide. Using the analysis for a parabolic optical fiber described by D. Gloge and E. A. J. Marcatili, "Multimode Theory of Graded-Core Fibers," Bell Systems Tech. Journ. 52, 1563 (1973), N.A. $= 2n\Delta n$, and for $n = 1.5$, $n \simeq 10^{-3}$, N.A. $\simeq 0.05$.

Figure 6:
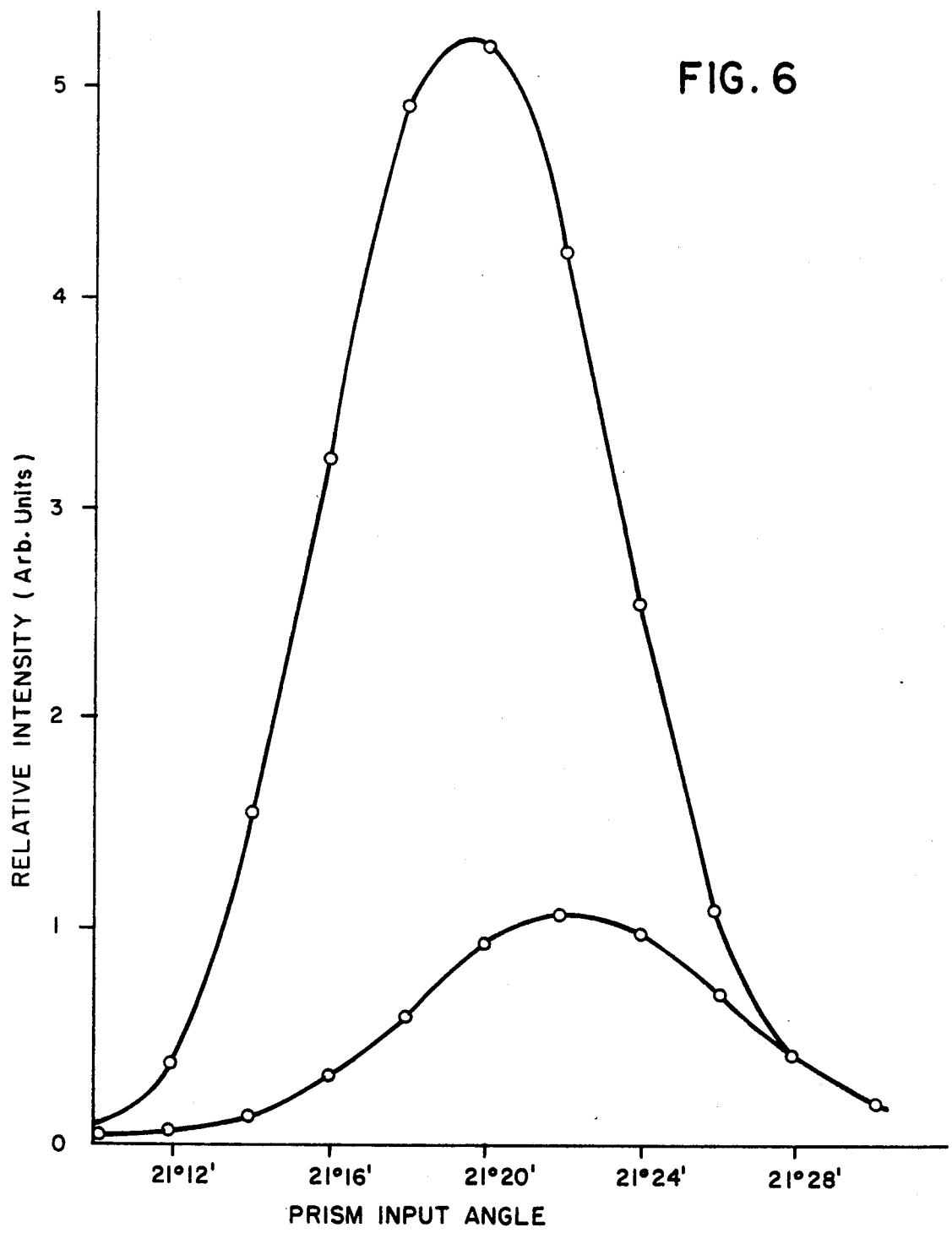
FIG. 6 shows relative beam intensity at a fixed point in the channel waveguide as a function of the incident angle $\theta_p$ to a 45° glass prism coupler for both TM and TE modes.

The waveguide acceptance angles were measured using a 45° glass prism coupler with a refractive index of 1.8. The result of the relative beam intensity within the waveguide as the incident angle to the prism $\theta_p$ increases is shown in FIG. 6 for both the TE and TM modes. For the specific coupling prism used, the waveguide effective refractive index $n_{eff}$ is related to $\theta_p$ by $dn_{eff}/d\theta_p - 0.5$. Since the acceptance angle $\Delta\theta_p$ is about 8 minutes $n_{eff} \simeq 1.2 \times 10^{-3}$, and N.A. $\simeq 0.06$. These results are in agreement with the estimated values based on the refractive index profile measurements.

Figure 7:
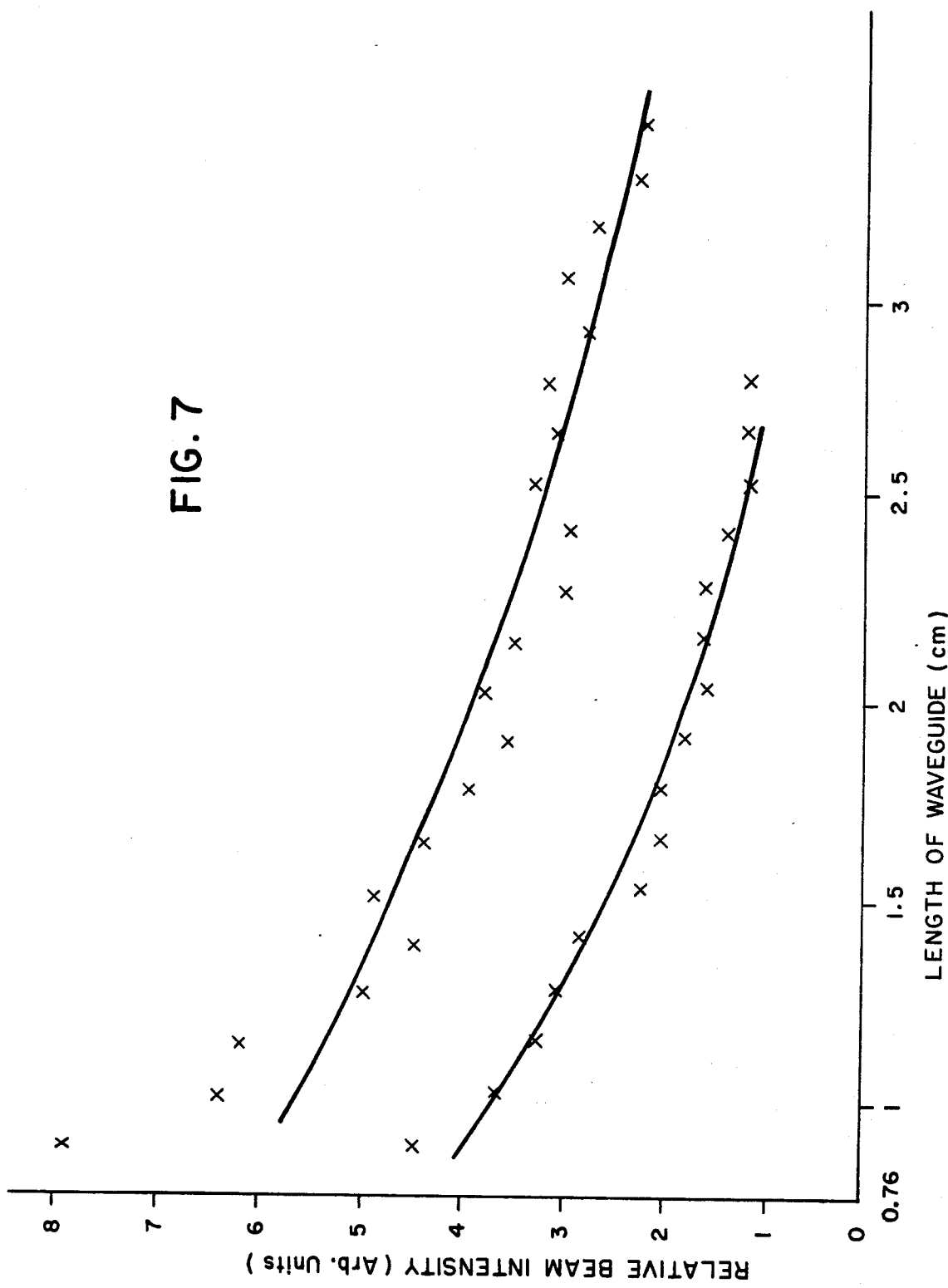
FIG. 7 shows relative beam intensity as a function of the channel waveguide path length for both the TM and TE modes.

The attenuation for both the TM and TE modes were measured using a sliding output prism coupler. The measured relative beam output intensity as a function of the waveguide length, as well as the least square fit of data to an exponential curves were plotted in FIG. 7. The optical losses were found to be 1.66db/cm and 3.1db/cm for the TM and TE modes respectively.

Figure 2:
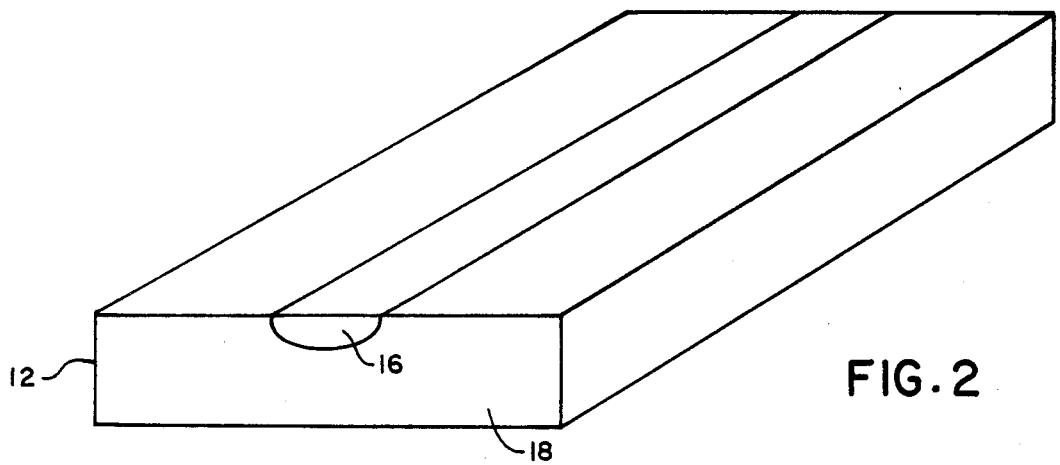
FIG. 2 shows an optical waveguide formed by the process shown in FIG. 1.
Figure 3:
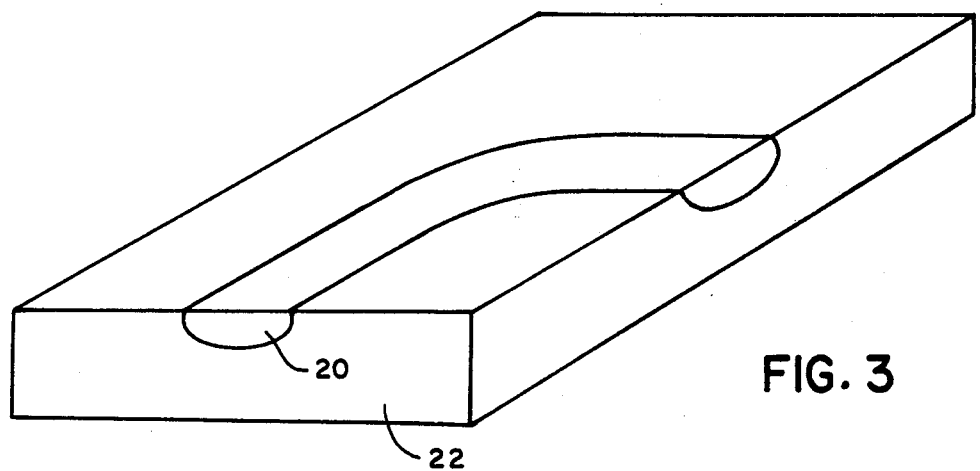
FIG. 3 shows another optical waveguide formed by the process of the present invention.

An advantage of the present fabrication technique is that a wide variety of waveguide patterns can easily be formed. FIG. 2 shows a straight line waveguide channel. FIG. 3, on the other hand, shows a curved waveguide 20 surrounded on three sides by substrate 22.

The fabrication technique of the present invention has many advantages. First, the technique is very simple. Second, the technique produces smooth, easily controlled waveguide profiles. Third, a wide variety of waveguide patterns can be formed by merely controlling the path followed by the energy beam. Fourth, the technique is applicable to a wide variety of optical waveguide materials, including electro optic, magneto-optic, and acousto-optic materials.

In conclusion, this invention has been described with reference to a series of preferred embodiments. Workers skilled in the art, however, will recognize that changes may be made in form and detail without departing from the spirit and scope of the invention.

The embodiments of of the invention in which an exclusive property or right is claimed are defined as follows:

1. A surface channel optical waveguide comprising: a body of glass material including a substrate region having a first index of refraction, second and third regions formed by laser beam exposure of a surface channel on said substrate, the upper surface of said second and third regions being substantially coplanar with a major surface of the material so that said second and third regions extend downwardly from said major surface, said second region being bordered by said substrate region and having its index of refraction substantially lowered from that of said substrate region, and said third region being bordered by said second region and having an index of refraction higher than that of said second region whereby waveguiding occurs in said third region wherein said regions define a W-shape refractive index profile.

2. The invention according to claim 1 wherein the index of refraction of said second region has a decreasing value progressing away from the substrate region toward the interface of the second and third region, and wherein the index of refraction of said third region has an increasing value progressing from said interface toward the channel center.

3. The invention according to claim 1 wherein the body of glassy material is a zinc-soda type cadmium sulfoselenide filter glass.

4. The invention according to claim 1 wherein the laser beam exposure is laser beam heating.

5. The invention according to claim 4 wherein the laser beam heating of said glassy material is to a temperature which causes a softening of said glassy material in said third region and wherein when subsequently cooled the second region is in a state of lower density and lower refractive index relating to the substrate, and the third region is in a state of higher density and higher refractive index relative to the second region.

6. The invention according to claim 1 wherein the second region is a surface channel in the substrate.

7. The invention according to claim 6 wherein the third region is a surface channel within the second region.

* * * * *